United States Patent [19]
Watanabe et al.

[11] Patent Number: 5,023,045
[45] Date of Patent: Jun. 11, 1991

[54] PLANT MALFUNCTION DIAGNOSTIC METHOD

[75] Inventors: Kenshiu Watanabe; Kiyoshi Tamayama, both of Oarai, Japan

[73] Assignee: Doryokuro Kakunenryo Kaihatsu Jigyodan, Tokyo, Japan

[21] Appl. No.: 476,922

[22] Filed: Feb. 7, 1990

[30] Foreign Application Priority Data

Feb. 7, 1989 [JP] Japan .................................. 64-28093

[51] Int. Cl.$^5$ .............................................. G21C 7/36
[52] U.S. Cl. .................................... 376/215; 376/216; 376/217; 364/274.9; 364/275.2; 364/148; 364/495; 364/513; 364/972.4
[58] Field of Search ...................... 376/215, 216, 217; 364/148, 274.9, 275.2, 495, 513, 972.4

[56] References Cited

U.S. PATENT DOCUMENTS

| | | | |
|---|---|---|---|
| 4,807,168 | 2/1989 | Moopenn | 364/602 |
| 4,853,175 | 8/1989 | Book | 376/216 |
| 4,906,940 | 3/1990 | Greene | 382/16 |
| 4,933,871 | 6/1990 | De Sieno | 364/513 |
| 4,947,482 | 8/1990 | Brown | 364/513 |

OTHER PUBLICATIONS

Hassberger et al., "A Simulation-Based Expert System for Nuclear Power Plant Diagnostics", Nuclear Science of Engineering: 102, 153-171 (1989).

*Primary Examiner*—Donald P. Walsh
*Attorney, Agent, or Firm*—Armstrong, Nikaido, Marmelstein, Kubovcik & Murray

[57] ABSTRACT

A plant malfunction diagnostic method is characterized by determining by simulation a change in a plant state variable, forming a pattern among plant state variables obtained by autoregressive analysis of the change in plant state variable, inserting the formed pattern among the plant state variables in a neural network, performing learning until a preset precision is obtained, and identifying the cause of the malfunction by inserting, in the neural network, a pattern which indicates the pattern among plant state variables formed by data gathered from the plant. This makes possible early identification of the cause of a malfunction. Plant rate of operation and safety are improved by allowing the operator to perform the appropriate recovery operation with a sufficient time margin.

2 Claims, 5 Drawing Sheets

NUMBER OF LEARNING CYCLES (TIMES)

| TYPE OF MULFUNC-TION CAUSE | DEGREE OF IDENTIFICATION | |
|---|---|---|
| | OUTPUT OF DIRECT-CAUSE ELEMENTS | MAXIMUM OUTPUT OF ELEMENTS OTHER THAN DIRECT-CAUSE ELEMENTS |
| (1) DROP IN REACTIVITY | 0.94±0.01 | 0.05 |
| (2) DROP IN FEEDWATER FLOW RATE | 0.95±0.01 | 0.06 |
| (3) INCREASE IN STEAM DRUM PRESSURE | 0.96±0.02 | 0.05 |
| (4) INCREASE IN MAIN STEAM FLOW RATE | 0.96±0.01 | 0.04 |
| (5) DROP IN FEEDWATER TEMPERATURE | 0.94±0.01 | 0.05 |

5,023,045

PLANT MALFUNCTION DIAGNOSTIC METHOD

BACKGROUND OF THE INVENTION

This invention relates to a plant malfunction diagnostic method for sensing a malfunction and identifying the cause thereof in a plant such as a nuclear power station or thermal power plant in which there are a large number of parameters to be monitored and the parameters are interrelated in a complicated manner.

Plants such as nuclear power stations or thermal power plants generally use a large number of annunciators adapted to issue an alarm to inform the operators of the occurrence of a malfunction if a level of plant state variable exceeds a predetermined limit value. For example, in a nuclear power plant or the like, the number of annunciators can be as many as several thousand, and a large number of lamps can flash in the occurrence even of a minor accident. Hence, it is difficult for an operator to be supplied solely with the information necessary. Consequently, various countries are developing systems for diagnosing malfunctions by utilizing computers. Typical systems are the nuclear power generating support system of Japan, the Gesellschaft für Reaktorischerheit (GRS) of West Germany, the STAR being developed by the Halden project of Norway, and the DAS being developed by commission of the EPRI (the Electric Power Research Institute of the United States).

A malfunction diagnostic method referred to as cause consequence Tree (CCT) is employed in these systems. For example, in accordance with CCT, the relationship between the causes of malfunctions and their consequences is represented in the form of a tree. When a malfunction occurs, the state of its consequence is observed and the branches of the tree are traversed in the reverse direction to arrive at the cause. Ordinarily, retrieval by CCT starts at the beginning of operation of an annunciator set to a level which is ±10-20% of a plant state variable under power operation. Therefore, after the occurrence of a malfunction which propagates rapidly in tens of seconds, the possibility arises that the operator may not be able to perform the proper recovery operation.

SUMMARY OF THE INVENTION

An object of the present invention is to identify the cause of a malfunction by detecting the malfunction at a level which is ±3-7% of the peak of a plant state variable during nomal operation before the annunciator is actuated, and to improve availability factor and safety of a plant by allowing the operator to perform the appropriate recovery operation with a sufficient time margin.

According to the present invention, the foregoing object is attained by providing a plant malfunction diagnostic method comprising a step of determining by simulation a change in a plant state variables at the time of a malfunction and forming a pattern of changes in plant state variables obtained by autoregressive analysis of the change in plant state variable, a step of inserting the formed pattern among the plant state variables in a neural network comprising an input layer, a middle layer and an output layer, and performing learning within a preset precision, and a step of identifying the cause of the malfunction by inputting the pattern of plant state variables formed from the plant state variable, after detection of an actual plant malfunction with respect to a neural network having connection weight between processing elements (neurons) in the input layer and the middle layer and between the middle layer and the output layer.

Other features and advantages of the present invention will be apparent from the following description taken in conjunction with the accompanying drawings.

DESCRIPTION OF THE PREFERRED EMBODIMENT

An embodiment of the present invention will now be described with reference to the drawings.

Figure 1:
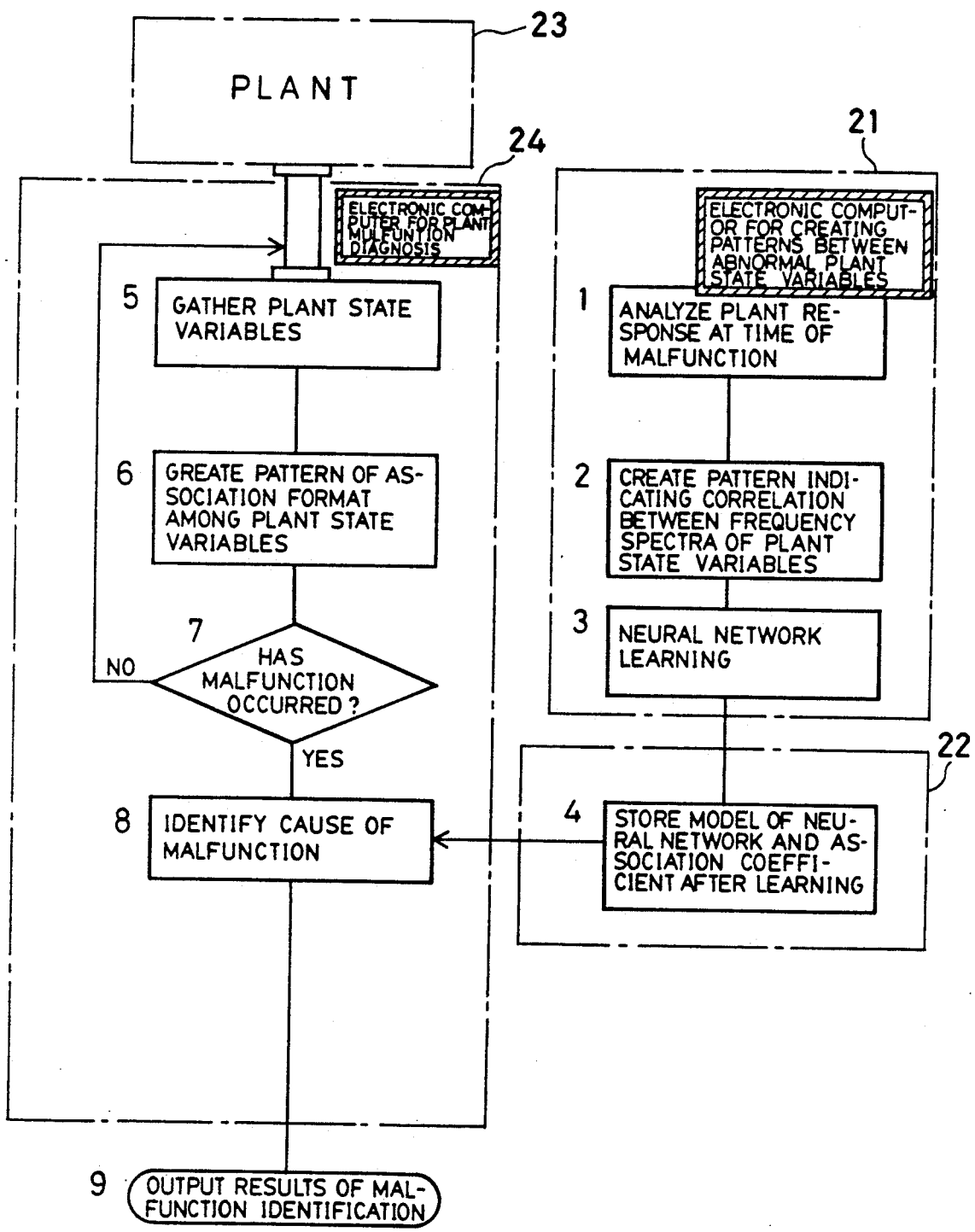
FIG. 1 is a block diagram for describing the procedure of plant malfunction diagnosis.
Figure 2:
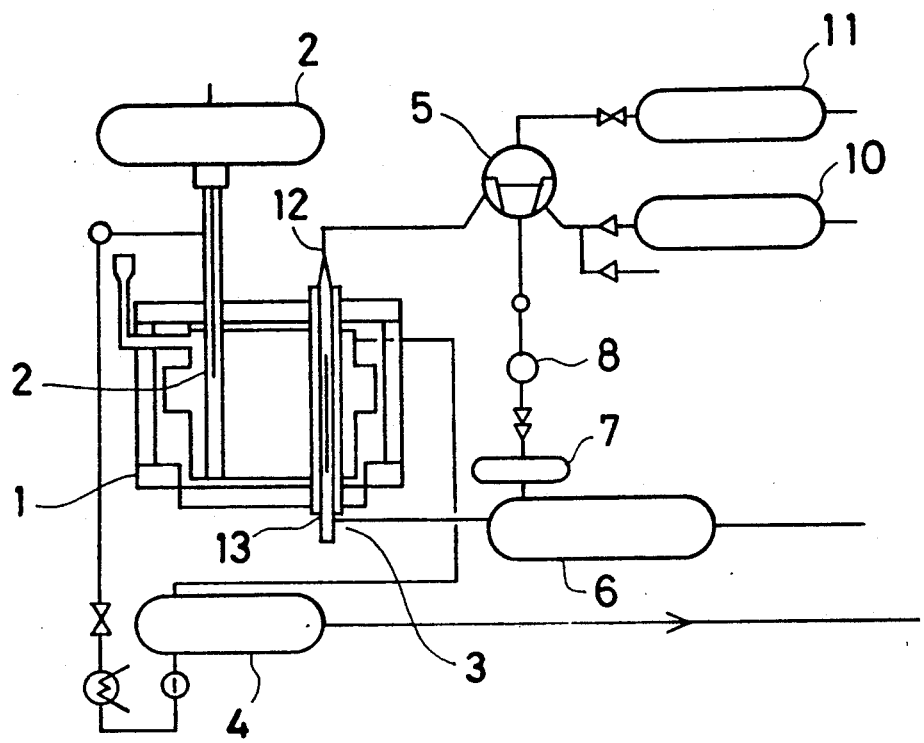
FIG. 2 is a diagram showing the overall construction of an advanced thermal reactor (ATR)
Figure 3:
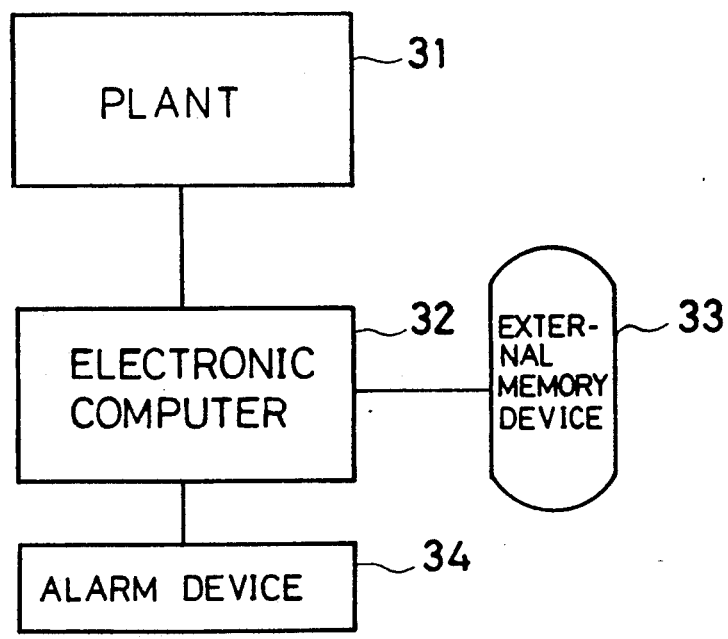
FIG. 3 is a block diagram showing a hardware configuration for performing plant malfunction diagnosis.
Figure 4:
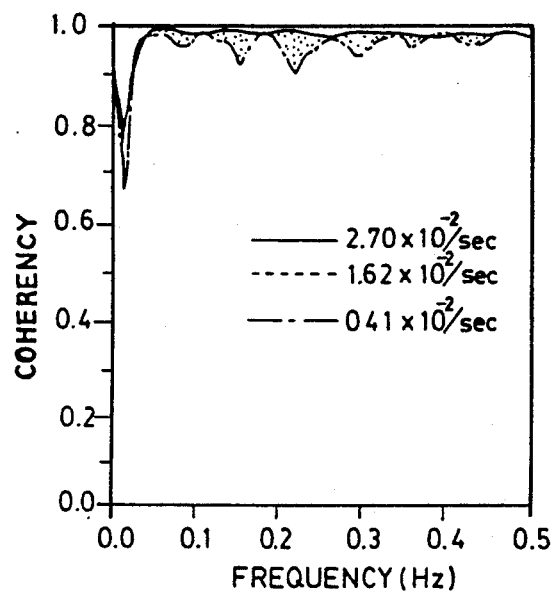
FIGS. 4(A), 4(B) and 4(C) are diagrams showing the correlation between frequency spectra of neutron flux and feedwater flow rate in cases where reactivity declines, feed flow rate declines and the pressure of a steam drum increases, respectively.
Figure 4:
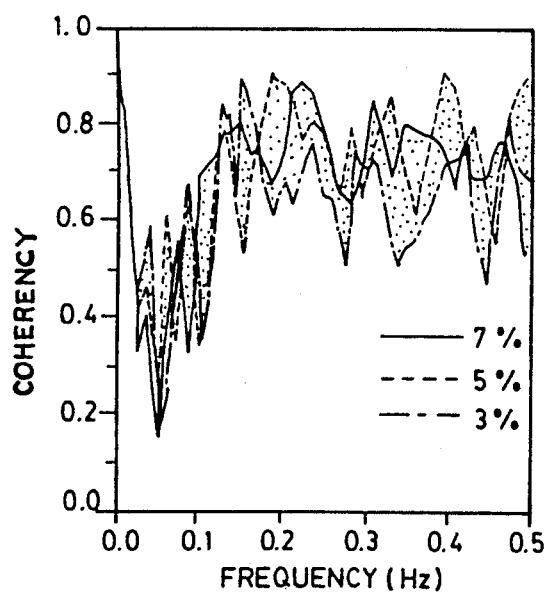
Figure 4:
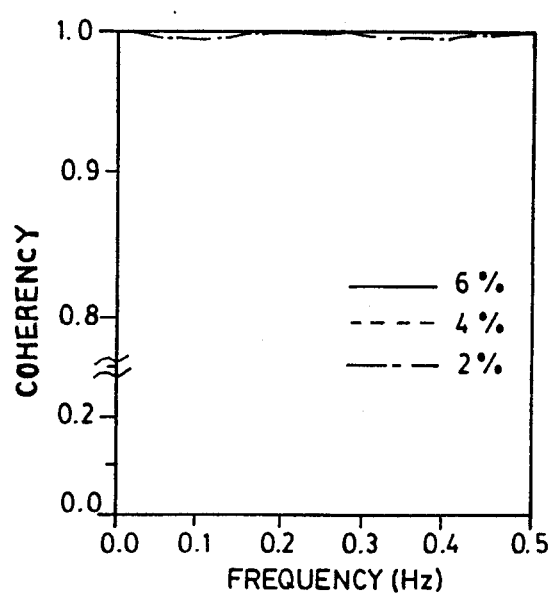
Figure 5:
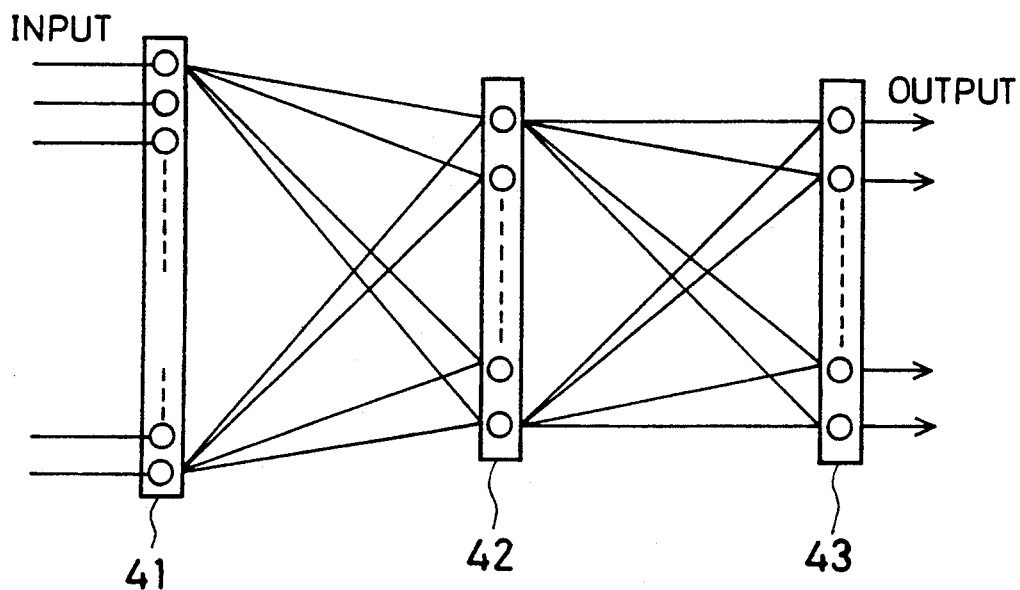
FIG. 5 is a diagram showing a model of a neural network.
Figure 6:
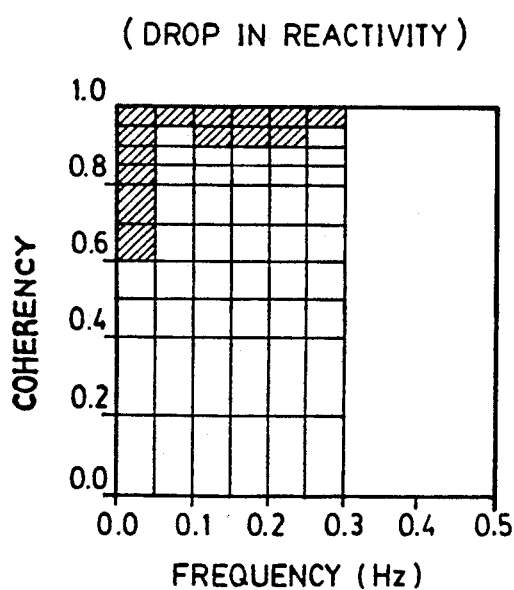
FIG. 6 is a diagram in which the correlation between frequency spectra is shown as a pattern.
Figures 7, 8:
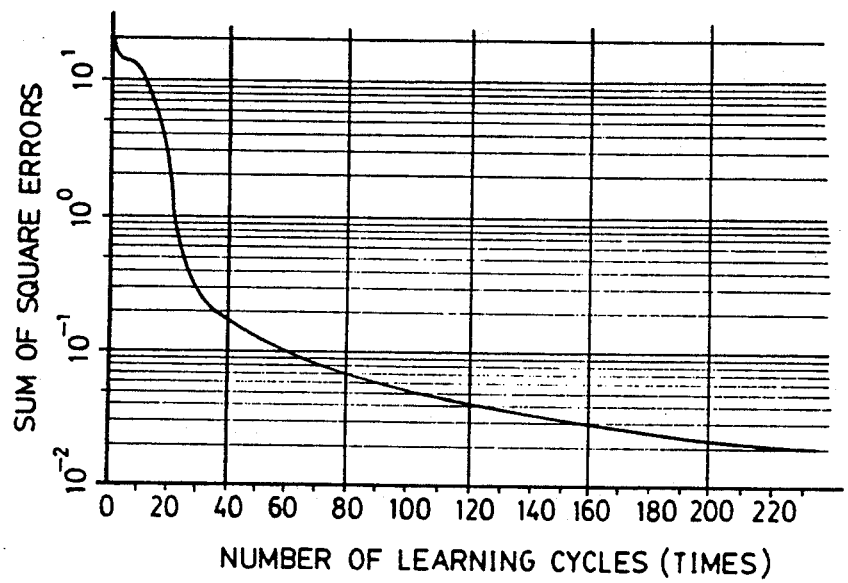
FIG. 7 is a diagram showing the learning of a neural network model.
FIG. 8 is a table showing the results of malfunction cause identification.

FIG. 1 is a block diagram for describing the procedure of plant malfunction diagnosis, FIG. 2 is a diagram showing the overall construction of an advanced thermal reactor (ATR), FIG. 3 is a block diagram showing a hardware configuration for performing plant malfunction diagnosis, FIGS. 4(A), 4(B) and 4(C) are diagrams showing the correlation between frequency spectra of neutron flux and feedwater flow rate in cases where reactivity declines, feed flow rate declines and the pressure of a steam drum increases, respectively, FIG. 5 is a diagram showing a model of a neural network, FIG. 6 is a diagram in which the correlation between frequency spectra is shown as a pattern, FIG. 7 is a diagram showing the learning of connection weights in a neural network, and FIG. 8 is a table showing the results of malfunction cause identification. Shown in these drawings are a calandria tank 1, a control rod 2, a pressure tube assembly 3, a heavy water cooling system 4, a steam drum 5, a coolant recirculating system 6, a water drum 7, a recirculating pump 8, a feedwater system 10, a main steam system 11, an outlet pipe 12, an inlet pipe 13, electronic computers 21, 24, a pattern memory device 22, plants 23, 31, a computer 32, an external memory 33, and an alarm device 34.

The principle of the plant malfunction diagnostic method of the present invention will now be described.

In carrying out plant malfunction diagnosis, the first step is to obtain the response of the plant parameters after the occurrence of an emergency. Since a malfunction cannot actually be made to occur in the plant in order to determine its plant response at an emergency, a simulation is performed using a simulation code, and the response of plant parameters, at an emergency when an external disturbance is applied is predicted.

For example, in a case where a drop in steam drum water level is selected as the type of malfunction, events (a) through (e) indicated below are selected, as inputtable the response of plant parameters after an occurrence of one the events can be obtained from calculation using the simulation codes, from a fault tree obtained by successively connecting, in the form of a tree, cause events each of which results in another event. For example, the above-described event (the drop in steam drum water level) is adopted as the event at the top of the tree, to this is connected a cause event considered to be that which results in the top event, and to this cause event is connected a cause event considered to be that which results in the former cause event, and so on. The events selected are, by way of example:

(a) a drop in reactivity;
(b) a drop in feedwater flow rate;
(c) an increase in the pressure of the steam drum;
(d) a drop in feedwater temperature; and
(e) an increase in main steam flow rate.

The occurrence of a drop in steam drum water level corresponds to a malfunction that leads to loss of water which, in an advanced thermal reactor (ATR) of the kind shown in FIG. 2, for example, is used for removing the heat produced by the reactor core, and this in turn can lead to core melt-down. Consequently, the steam drum water level is constantly monitored by the operator very carefully. In the ATR of FIG. 2, heavy water is circulated as a moderator within the calandria tank 1, the heat produced in the moderator is removed by the heavy water cooling system 4, the space between the calandria tubes and the pressure tubes is filled with carbon dioxide gas to serve as a heat insulator, a coolant is circulated through the pressure tubes by the coolant recirculating system 6, water is fed by the feedwater system 10, and steam generated by the steam drum 5 where the feed water flows into is extracted through the main steam system 11 in order to be utilized.

Next, with regard to plant state variables obtained from the plant dynamic characteristic analysis, a deviation from steady operation is obtained as shown by the following equation:

$$x_{i,t} = \frac{y_{i,o} - y_{i,t}}{y_{i,o}} \quad (1)$$

where
$x_{i,t}$: deviation value of plant state variable when type of plant state variable is i and time is t;
$y_{i,o}$: value of plant state variable under full power operation when type of plant state variable is i;
$y_{i,t}$: value of plant state variable at time t when type of plant state variable is i Eq. (1) is normalized and made dimensionless in such a manner that plant state variables having different dimensions, such as pressure, temperature and flow rate, can be compared with one another.

Next, with regard to a plant state variable normalized by computer using autoregressive analytic codes, a pattern indicating the correlation between the frequency spectra of state variables is created. Among the autoregressive analytic codes, time series data X(t) can be expressed as the following equation (2):

$$X(t) = \sum_{m=0}^{M} A(m)X(t - m) + U(t) \quad (2)$$

where
X(t): transposed matrix of $[x_1(t), x_2(t), \ldots x_k(t)]$
$x_k(t)$: deviation value at time t of plant state variable of type k
U(t): white noise
M: dimension of autoregressive coefficient A spectrum density function P(f) can be obtained as indicated by the following equation from the residual covariance matrix $\Sigma$ and autoregressive coefficient A(m):

$$P(f) = (A(f))^{-1} \Sigma ((\overline{A(f)})^T)^{-1} \quad (3)$$

A(f) is a matrix in which a (j,s) element is $A_{js}(f)$, P(f) is a matrix in which a (i,j) element is $P_{ij}(f)$, ( )$^{-1}$ is an inverse matrix, ( )$^T$ is a transposed matrix and ($-$) is a complex conjugate. Further, $A_{js}(f)$ is obtained by a Fourier transformation of the autoregressive coefficient A(m), as indicated by the following equation:

$$A_{js}(f) = \sum_{m=0}^{M} A_{js}(m)\exp(-i2\pi fm) \quad (4)$$

The correlation between the frequency spectra of the plant state variables i and j can be expressed by a coherency function given by the following equation:

$$COH(f)_{ij} = |P(f)_{ij}|/(P(f)_{ii} \cdot P(f)_{jj}) \quad (5)$$

Within the ATR of FIG. 2, by way of example, the types of plant state variables for which the correlation between these frequency spectra is examined are neutron flux, recirculation flow rate and steam drum water level in the recirculating system, feedwater flow rate and feedwater temperature in the feedwater system, main steam flow rate, pressure in a steam line and main steam regulative valve opening in the main steam system, and turbine output in the turbine system. The correlations (coherency functions) between the frequency spectra of neutron flux and feedwater flow rate from among these state variables are an indicated in FIG. 4.

FIG. 4(A) is for a case where reactivity drops, 4(B) for a case where feedwater flow rate drops, and 4(C) for a case where there is an increase in pressure at the steam drum vapor phase portion. In case of a drop in reactivity, the speed of the malfunction changed at a rate of $2.70 \times 10^{-2}$ \$/sec, $1.62 \times 10^{-2}$ \$/sec and $0.41 \times 10^{-2}$ \$/sec. In the case of feedwater flow rate, flow rate diminished in the form of a step function to 3%, 5% and 7%. In case of an increase in pressure at the steam drum, pressure increased in the form of a step function to 2%, 4% and 6%. In FIGS. 4(A) through 4(C), frequency is plotted along the horizontal axis and the magnitude of the correlation is plotted along the vertical axis.

On a broad survey of these Figures, it can be said that the patterns differ from one cause of a malfunction to another without dependence upon the speed or magnitude of the malfunction. When viewed locally, however, these patterns fluctuate when the speed or magnitude of the malfunction is changed. In other words, the correlation value possesses a certain width with respect to a certain single frequency. This width is indicated by applying the net in the Figures.

Connection weights in the neural network are learned using these patterns that prevail at a malfunction, patterns obtained with respect to actual plant state variables which change from one minute to the next in the model of the neural network are inputted using the connection weights after learning, and the cause of the malfunction is identified.

First, a model of a neural network will be illustrated, then a neural network learning rule, and finally an embodiment of learning.

FIG. 5 is a diagram showing a neural network model, in which numeral 41 denotes an input layer, 42 a middle or hidden layer, and 43 an output layer.

As shown in the model of the neural network, the network comprises three layers, namely the input layer 41, middle or hidden layer 42 and output layer 43. The number of elements is 96 in the input layer 41, 2-9 in the middle or hidden layer 42, and 5 in the output layer 43. The method in which the elements in the input layer are utilized will be described in detail in the embodiment of learning. The number of elements in the middle or hidden layer is chosen to be between two and nine to minimize computer load. Since the elements in the output layer are made to correspond to the malfunctions to be identified, the number thereof is also made to correspond to the number of malfunctions to be identified. Five malfunctions will be considered here, namely a drop in reactivity, a drop in feedwater flow rate, an increase in pressure at the steam drum, a drop in feedwater temperature, and an increase in main steam flow rate.

A learning rule will now be illustrated.

(1) An input signal is fed into the input layer.

(2) A change in the state of each neuron is successively calculated as the signal is transmitted from the input layer to the output layer.

(b 3) In accordance with a back-propagation method, $O_i$ is adopted as the output of the i-th neuron of the output layer obtained from the result of the calculation in (2), and $d_i$ is adopted at the desirable output (an teaching signal) of the neuron corresponding to the input signal. Then, the value of the weight of connection strength is varied so as to minimize the square error $$E = \tfrac{1}{2}\Sigma (d_i - O_i)^2 \qquad (6)$$

of the difference between the desirable output and the output actually obtained. A learning signal $\delta_i^N$ of the i-th neuron of an N-th stage in and after the middle layer can be determined from recursive calculation in accordance with the following Eq. (7) using a learning signal $\delta_k^{N+1}$ of each neuron of an (N+1)th stage:

$$\delta_i^N = f_i'(u_i^N) \Sigma \delta_k^{N+1} w_{ki}^{N+1,N} \qquad (7)$$

Here
$u^N$: the internal state of the i-th neuron of the N-th stage $$\left[ = \sum_j w_{ij}^{N,N-1} x_j^{N-1} \right]$$

$f_i$: is the output function of the i-th neuron of the N-th stage $(x_i^N = f_i(u_i^N))$ $f_i'$: the differentiated value of $f_i$ The initial value of $\delta$, namely the learning signal $\delta_i^P$ of the output layer, is obtained in accordance with the following Eq. (8):

$$\delta_i^P = (d_i - O_i)f'(u_i) \qquad (8)$$

Accordingly, the values of the learning signals are calculated successively from the output layer toward the input layer using the initial value $u_i^P$ of the internal state $u_i^N$ of the i-th neuron in the output layer, as well as Eq. (7).

(4) A learning process in which a certain input signal is applied and the desirable output signal corresponding thereto is presented to change the weight of connection strength is performed repeatedly with respect to a set of output instructor signals corresponding to various input signals. The rule for changing the weight of connection strength for every learning process is given by the following Eq. (9) using the learning signal obtained from the procedure of (3):

$$\Delta w_{ij}^{N,N-1}(n+1) = \eta \delta_i^N x_j^{N-1} + \alpha \Delta w_{ij}^{N,N-1}(n) \qquad (9)$$

n: number of learning cycles
$\eta$: learning constant
$\alpha$: stabilizing constant Input signals and the teaching signals corresponding thereto are presented to the neural network one after another every step. By thus building up the number of learning cycles, the sum of the squared errors indicated by Eq. (6) is reduced.

An embodiment of learning will now be illustrated.

First, the 96 elements in the input layer are classified, then an example of plant state variables used in identifying the cause of malfunctions is illustrated.

Sixty of the elements in the input layer are used to identify input patterns, namely the shapes of the coherency functions. To this end, as shown in FIG. 6, a plane indicating a spectrum is divided into 60 rectangles. A rectangle in which the value of the coherency falls within its limits is expressed by a signal "1" (the shaded portions), and a rectangle in which the value of the coherency does not fall within its limits is expressed by a signal "0" (the white portions). The sixty elements of the input layer bear the respective rectangles as an approximate expression partitioned into 60 portions. When partitioning by the rectangles, initially the horizontal axis of the coherency function from 0 Hz to 0.3 Hz is equally divided into six segments. The vertical axis indicating the correlation values from 0 to 1 is divided into ten portions, but this partitioning is not performed equally. Rather, a range in which the correlation values are small is partitioned roughly, and a range in which the correlation values are large is partitioned finely to raise the analytical precision in case of large correlation values. The range from 0.0 to 0.4 is divided at the 0.2 mark, the range from 0.4 to 0.8 is partitioned into four zones every 0.1, and the range from 0.8 to 1.0 is partitioned into four zones every 0.05. Thirty-six elements are used in order to obtain the type of combination of plant state variables, namely the coherency function of a particular combination of plant state variables. The coherency function of a particular combination of plant state variables is identified by these 36 elements. More specifically, which coherency function of a combination is taught depending upon which element is provided with a "1" signal. The partitioning by 60 is an operation for the purpose of reducing the amount of input information. It is permissible to increase the number of partitions if the processing capability is sufficient.

There are five combinations plant state variable used, namely a combination of neutron flux and main steam flow rate, a combination of steam drum water level and main steam flow rate, a combination of recirculation flow rate and main steam flow rate, a combination of pressure at the steam line and main steam regulating valve opening, and a combination of feedwater flow rate and feedwater temperature. Learning is performed until the identification error is reduced to a sufficiently small range of values (e.g., ±10%). As for the learning constant, use is made of, e.g., 0.250, which is commonly used in the back-propagation method, and the value 0.9 is employed as the stabilizing constant. Random numeric values are given the initial values of the weight of connection strength and in the order the coherency function are inputted.

The method when a pattern collation is carried out will now be illustrated.

First, a pattern $z_1, z_2, \ldots z_n$, which indicates the correlation of a frequency spectrum of plant state variables initially created utilizing a simulator is inputted to a neural network, learning is performed until the malfunction cause identification error falls with the desirable range, and the values of the weight of connection strength $w^{N,N-1}$, $w^{N+1,N}$ between the input layer and middle layer and between the middle layer and output layer are decided. This neural network model and the values of the weight of connection strength w are stored as a referential malfunction pattern. When a drop in the steam drum water level is detected, a pattern $z_1'$, $z_2', \ldots z_n'$ obtained from the actual plant state variables which change from moment to moment are inserted into the neural network model which uses these weight, and the cause of the malfunction is identified. In order to identify the cause of the malfunction using an ambiguous pattern in which a correlation value possesses a certain width with respect to a certain single frequency, utilizing the neural network is powerful.

An example of the results of malfunction cause identification are illustrated in FIG. 8.

FIG. 8 illustrates a case in which, when a pattern of a coherency function indicating a drop in reactivity is inputted to an input layer, 0.94±0.01 is obtained from output elements corresponding to the drop in reactivity when the output obtained under ideal conditions is 1, and a maximum of 0.05 is obtained from the other output elements. Similarly, when patterns of coherency functions indicating a drop in feedwater flow rate, an increase in steam drum pressure, an increase in main steam flow rate and a drop in feedwater temperature are inputted, outputs of 0.95±0.01, 96±0.02, 0.96±0.01, and 0.94±0.01 are obtained from the respective corresponding output elements. At this time the outputs from the other output elements are maximum, i.e., 0.06, 0.05, 0.04, 0.05, respectively. Accordingly, the output of a direct-cause element can be obtained at a magnitude which enables it to be sufficiently distinguished from the outputs of the other elements. As a result, it is possible to immediately identify the cause.

A procedure for diagnosing plant malfunction based on this principle will now be described with reference to FIG. 1.

In FIG. 1, the electronic computer 21 has a function for creating a referential malfunction pattern and creates patterns between abnormal plant state variables. Specifically, plant response analysis at the time of malfunction is performed at step (1) using a simulator, a pattern indicating the correlation of the frequency spectra of the plant state variable is created at step (2), and neural network learning is performed at step (3) to decide the model of the neural network and the connection weight.

Next, at step (4), the model of the neural network created at step (3) and the value of the connection weight in the model are stored, as a reference malfunction pattern, in the external memory 22, comprising a magnetic disk, by way of example.

At step (5) the computer 24 for plant malfunction diagnosis gathers the plant state variables from the actual plant 23 changing from moment to moment, and at step (6) the computer creates a pattern between plant state variables just as in the case where the pattern was formed at step (2).

If the value indicated by a water level indicator of the steam drum is has become smaller than usual, a malfunction is detected at step (7). With regard to the threshold value for determining whether the malfunction has or has not occurred in this case, use is made of a value slightly larger than a value $(x_2 \pm \delta x_2)$ which fluctuates owing to noise contained in the measurement line $(x_2)$ of the water level indicator.

Next, at step (8), the pattern between plant state variables of step (6) is inputted to the neural network model, for which the connection weight has been determined, stored as the referential malfunction pattern, and the cause of the malfunction is identified as described above. The result of the malfunction identification is outputted to a computer printer or the like at step (9).

Thus, if the identification of the cause of the malfunction is done by using the neural network, a warning in the control room is issued as by flashing an indicator lamp. If the cause is not clarified, operation returns to the start of plant malfunction diagnosis. In this case, it is permissible to take measures such as presenting a "CONFIRMING OPERATION" indication to the operator.

Thus, as set forth above, a cause of malfunction can be identified by utilizing a neural network to be able to distinguish a change in the patterns between plant state variables, such as the neutron flux, temperature, flow rate, pressure and valve opening in a nuclear power plant, which can be readily monitored in a central control room.

FIG. 3 is a diagram showing the hardware configuration for performing this malfunction diagnosis. Numeral 31 denotes the plant, 32 the electronic computer, 33 the external memory device and 34 the alarm device, the actions of which are as described above.

In accordance with the present invention as described above, the overall state of a plant is judged in a comprehensive manner where collation between changes in plant parameters is investigated. As a result, the cause of a minor malfunction is identified and the operator is informed accordingly, whereby a recovery operation can be carried out at an early stage and it becomes possible to improve not only plant rate of operation but also the safety of the plant.

As many apparently widely different embodiments of the present invention can be made without departing from the spirit and scope thereof, it is to be understood that the invention is not limited to the specific embodiments thereof except as defined in the appended claims.

What is claimed is:

1. A plant malfunction diagnostic method comprising:

a step of determining by simulation a change in a plant state variable at the time of a malfunction and forming a pattern among plant state variables obtained by autoregressive analysis of the change in plant state variable;

a step of inserting the formed pattern among the plant state variables in a neural network comprising an input layer, a middle layer and an output layer, and performing learning within a preset precision to decide a model of the neural network as well as connection weight between processing elements (neurons) in the input layer and middle layer and between the middle layer and the output layer; and a step of identifying the cause of the malfunction by inputting a pattern, which indicates the pattern among plant state variables formed from the plant state variable, after detection of an actual plant malfunction.

2. The method according to claim 1, wherein the pattern among said plant state variable is a coherency function indicating a correlation of the frequency spectrum of each plant state variable.

* * * * *